United States Patent [19]
Mannell

[11] 3,881,339
[45] May 6, 1975

[54] EXTRUSION PULLERS

[75] Inventor: Keith Edward Mannell, Chestnut, England

[73] Assignee: Edwards & Company, Chestnut, Hertfordshire, England

[22] Filed: May 23, 1973

[21] Appl. No.: 363,148

[30] Foreign Application Priority Data
May 25, 1972 United Kingdom............... 24700/72

[52] U.S. Cl. ...................... 72/257; 214/1.1; 72/290
[51] Int. Cl. ......................... B21c 35/00; B21c 1/14
[58] Field of Search ....... 72/257, 290, 426; 214/1.4, 214/1.7

[56] References Cited
UNITED STATES PATENTS

| 3,116,832 | 1/1964 | Pieron et al. ..................... 72/257 X |
| 3,537,286 | 11/1970 | Spielvogel et al................ 72/257 X |
| 3,587,280 | 6/1971 | Engelhardt............................ 72/257 |
| 3,659,531 | 5/1972 | Goeke................................. 214/1.4 X |

Primary Examiner—Milton B. Mehr
Attorney, Agent, or Firm—Steinberg & Blake

[57] ABSTRACT

An extrusion puller comprising an elongated rail, with a carriage movable along the said rail, the said carriage carrying a gripper head for grasping the end of the extrusion to be pulled, and the carriage being powered by an on-board linear motor co-operable with the said rail.

15 Claims, 9 Drawing Figures

EXTRUSION PULLERS

The present invention relates to extrusion pullers, by which general term it is intended to embrace arrangements of the type known in the art as "extrusion pullers," but which in fact could be more accurately described as front end guides for assisting removal of aluminium or like metal extrusions from an extrusion press, with a small degree of tension. Thus although, for convenience, reference will be made hereinafter to extrusion pullers, it should be borne in mind that in practice such arrangements exert a significant but nevertheless relatively small pulling effect. The speed of movement of an extrusion puller, when utilised to assist in removing extruded materials from a press, is governed predominantly by the speed at which the material extrusion emerges from the extrusion press.

In the art of pulling extrusions, it is known to be desirable and generally essential to exert a constant pull on the extrusion as it is removed from the die. In the case of multi-hole dies it is also desirable and generally essential to maintain an equal spacing between the various die-produced parts. Such requirements are concerned predomintly with avoiding twisting during pulling, because the removal of twists entails considerable further work at later cold stages.

Accordingly, it is an object of the present invention to provide improvements in the art of extrusion pulling which may be applicable to any form of horizontal extrusion press and to any form of material. For present purposes, however, reference will be made generally to aluminium, although it is to be understood that the invention is no way limited to the pulling of aluminium extrusions.

In accordance with the prior art, extrusion pullers generally exert a positive tension on the extrusion being pulled. Such prior art constructions generally comprise a carriage which runs on rails and which is provided with grippers for gripping the end of the emergent extrusion. The carriage is generally powered by a drive unit at the end of the rails, connected to the carriage by wire or light ropes. The problem with such arrangements is that it is difficult to match the speed of the carriage to the speed of the extrusion and large errors are to be expected. Such errors can be of significance, because they create variations in tension which provide latitude for twisting.

The present inventive concept relies predominantly on realisation of the fact that by using a linear motor to power the carriage, it is possible greatly to facilitate control and reduce the risk of errors.

In accordance with one aspect of the invention there is provided an extrusion puller which comprises an elongated rail, with a carriage movable along the said rail, the said carriage carrying a gripper head for grasping the end of the extrusion to be pulled and the carriage being powered by an on-board linear motor cooperable with the said rail. With such an arrangement there is no positive engagement between the carriage and any off-board power arrangement, although by the use of suitable on-board pick-ups and conductors extending along the rail length it is possible to supply the carriage remotely with a fixed power rating.

Either one or more linear motors may be used on a single carriage and conveniently the rail is of sandwich form with an aluminium covering between the steel rail and the linear motor active surface.

In practice it is found that by controlling the power supplied to the or each linear motor on the carriage, such control being by signals from a remote control station to a power variation device on the carriage, it is possible to control the tension applied to the extrusion being pulled without interfering with the manner in which the speed of the carriage is controlled to a predominant extent by the speed of emergence of the said extrusion. Generally it is possible to deduce and evaluate the tension force to be applied to the extrusion being pulled. Thus the remote control may conveniently be marked in pound or kilograms pulling force and set to a required value by an operator. This value may also be altered in a plus or minus direction if the operator believes that instant circumstances require such alteration. This may, for instance, be advantageous where it is required to clear a bad or faulty die.

By virtue of the characteristics of a linear motor, its mounting on board the carriage provides not only a drive for the carriage but also an integrated clutch effect. This clutch effect follows from the inherent possibility of slip in the operation of the linear motor over the rail, which slip provides an effect in practice comparable to the provision of complicated slipping clutch devices in a positive drive rotary motor. Thus the use of a linear motor in effect provides two advantages at one and the same time - on-board drive and clutch effect for pulling control. The degree of clutch effect may be controlled by the degree of power applied to the motor.

Advantageously the or each motor is under the control of solid state circuitry, carried also on-board the carriage.

In accordance with a preferred embodiment of the invention, the gripper head houses a plurality of horizontally pivoted depending fingers, which are individually tiltable about a common axis and are individually spring loaded, but may be collectively power driven out of and into engagement with an extrusion end.

In accordance with a highly preferred feature of the invention, the gripper head also comprises two half jaws movable laterally outwards, conveniently from a central gap, about horizontal axes at right angles to the axis of the fingers. The movement of the jaws outwards and inwards is conveniently under power control associated with the power control for the fingers. Advantageously the control of the fingers and jaw halves is also associated with the control of the carriage.

By the use of an on-board linear motor with pick-up through stationary conductors there are no trailing wires associated with the carriage; the absence of trailing wires will be advantageous for self-evident reasons. The rail which carries the carriage may be a monorail or any other suitable form of rail and conveniently the pick-up is through rails which are insulated but have grooves therebelow to receive pick-up collectors.

Conveniently the carriage is provided with top, bottom and side guide rollers, advantageously on eccentric mounts.

In order that the invention may be more readily understood, reference will now be made to the accompanying informal drawings, which are given purely by way of example, and in which.

Figure 1:
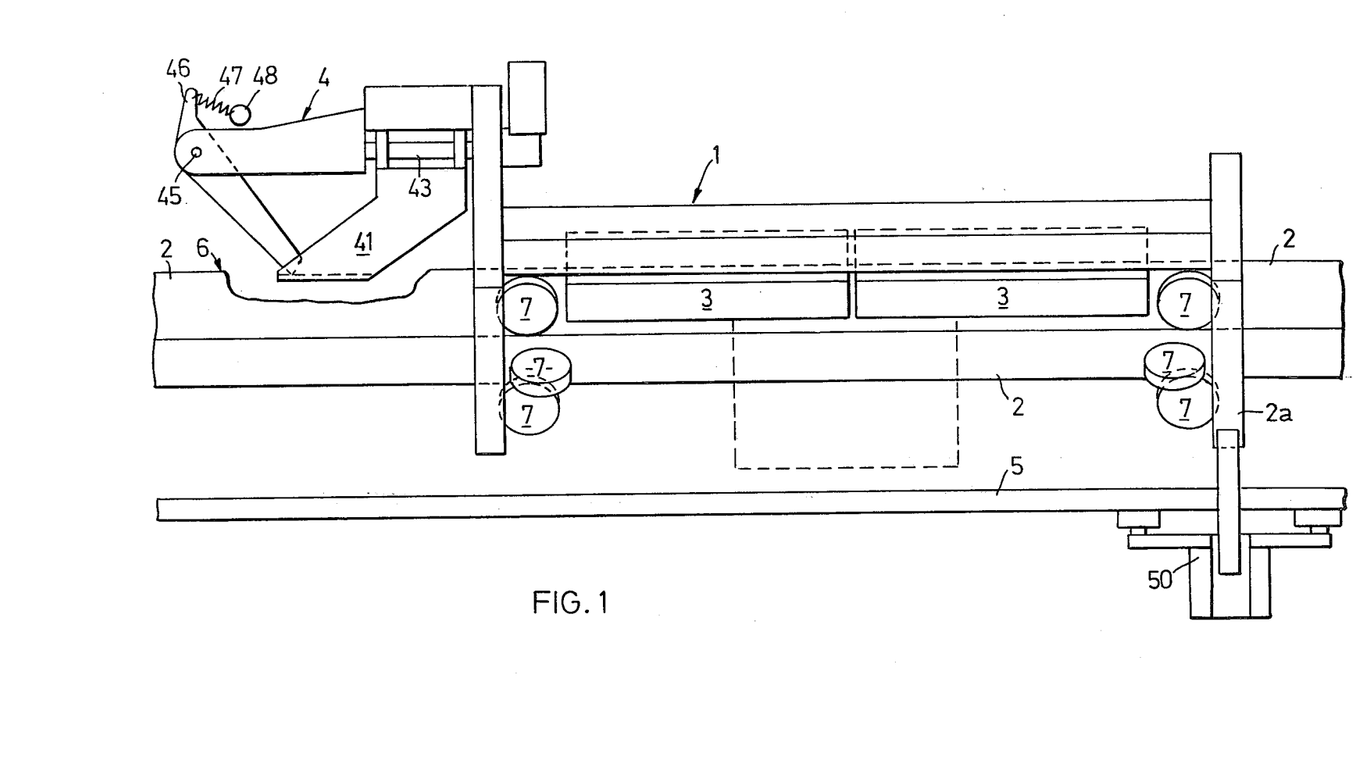
FIG. 1 shows in simplified side view a carriage of an extrusion puller according to the present invention.
Figure 2:
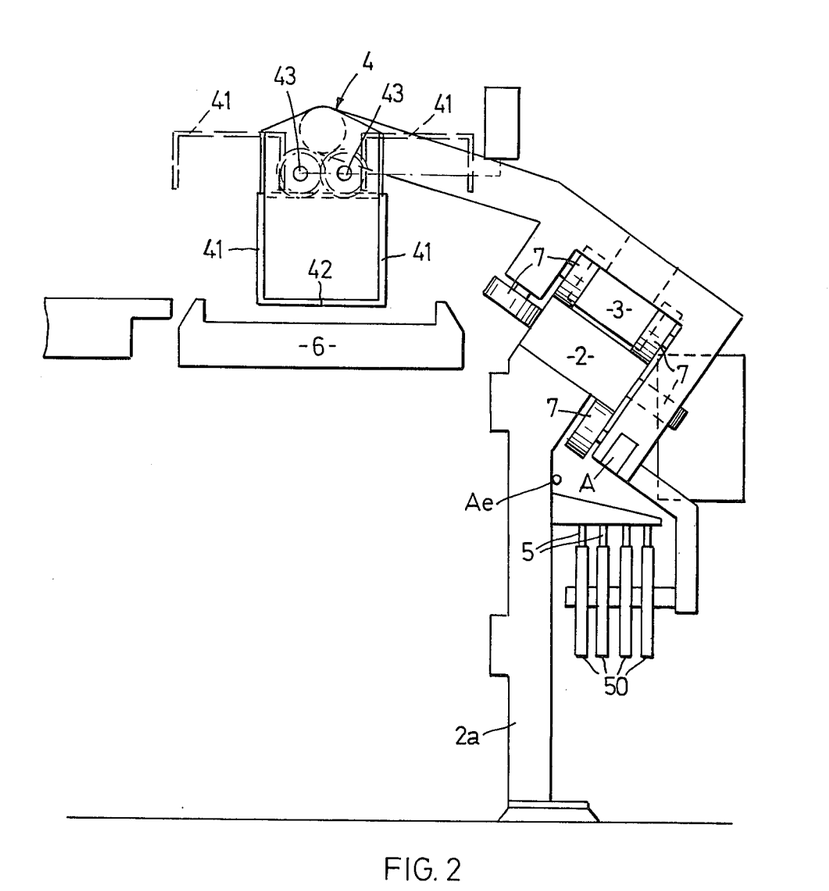
FIG. 2 illustrates the carriage of FIG. 1 in similarly simplified end view, FIGS. 3a and 3b together illustrate a carriage generally similar to that of FIGS. 1 and 2, in somewhat more detailed plan view from above.
Figure 3A:
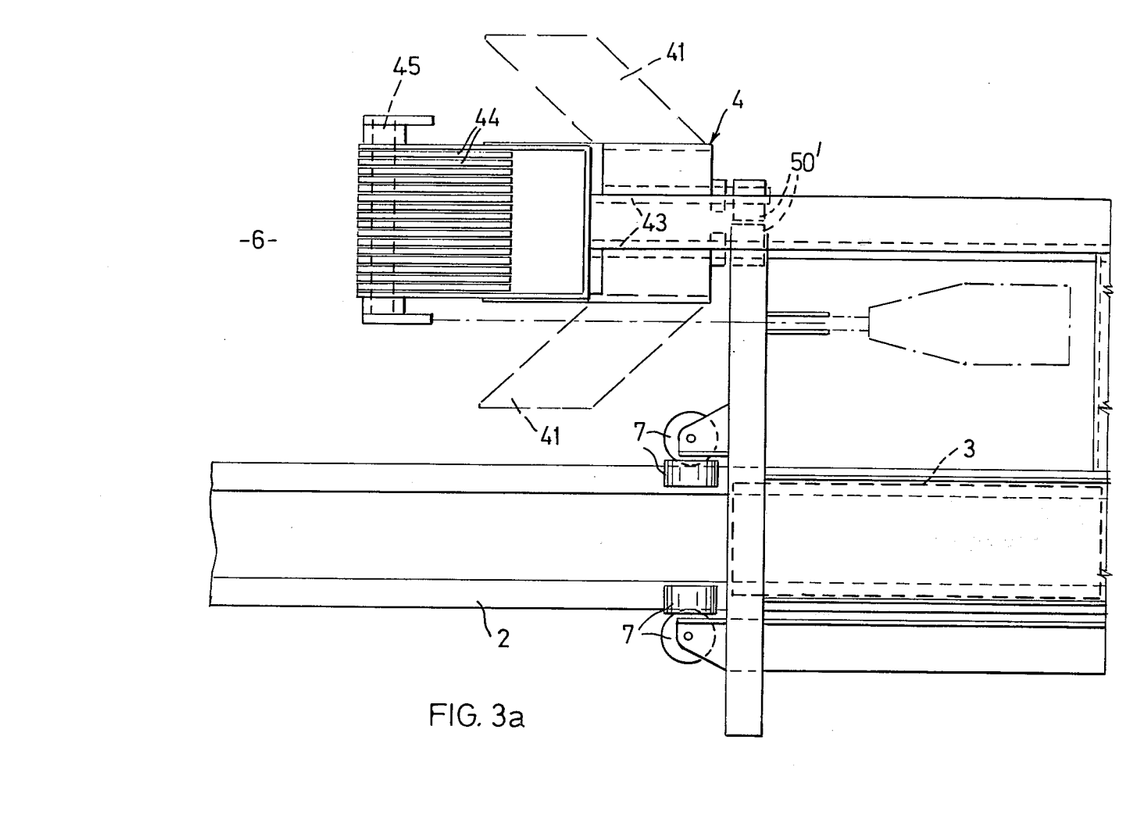
Figure 3B:
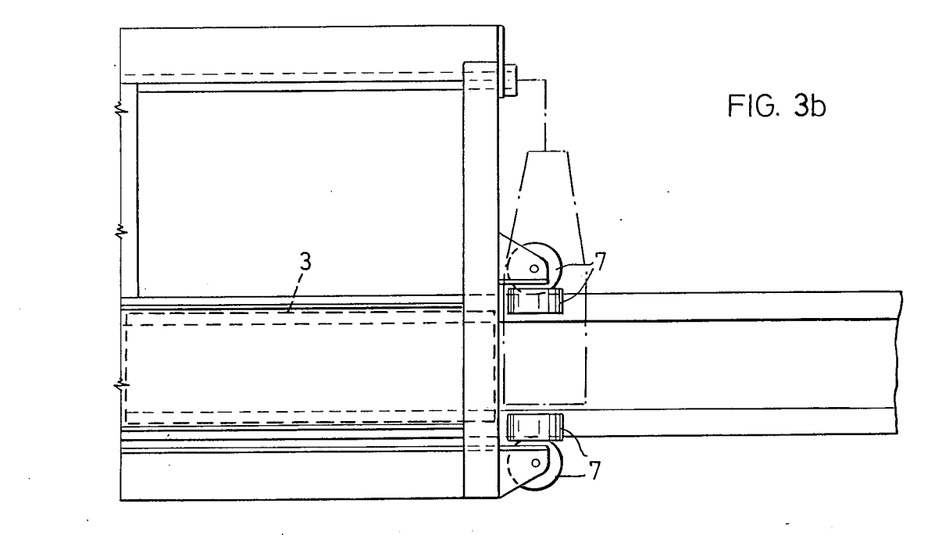
Figure 4A:
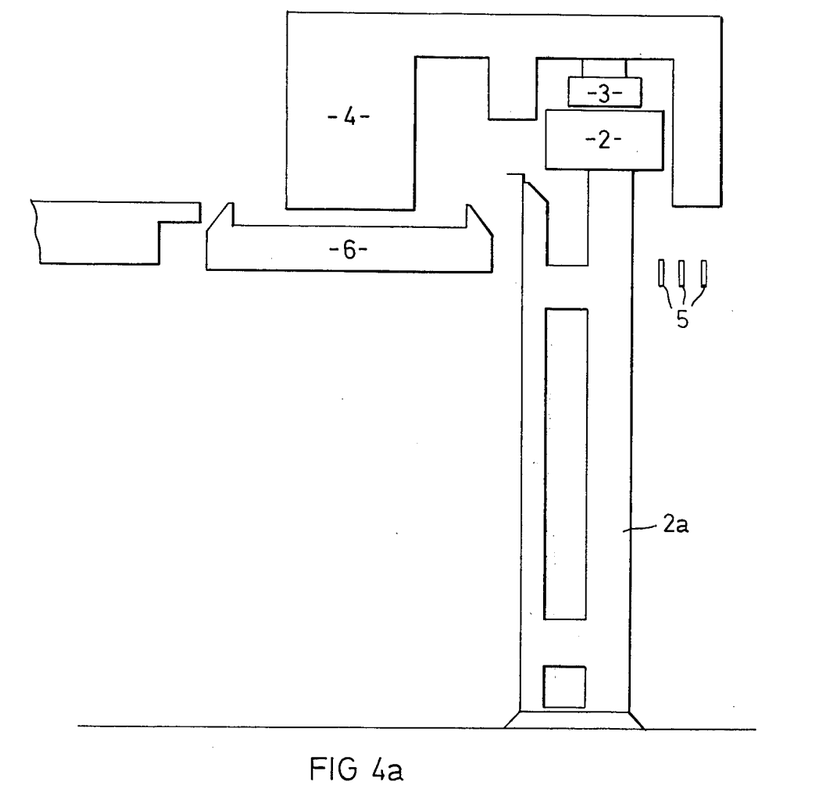
FIG. 4a illustrates a first method of arranging a carriage with respect to a flat rail.
Figure 4B:
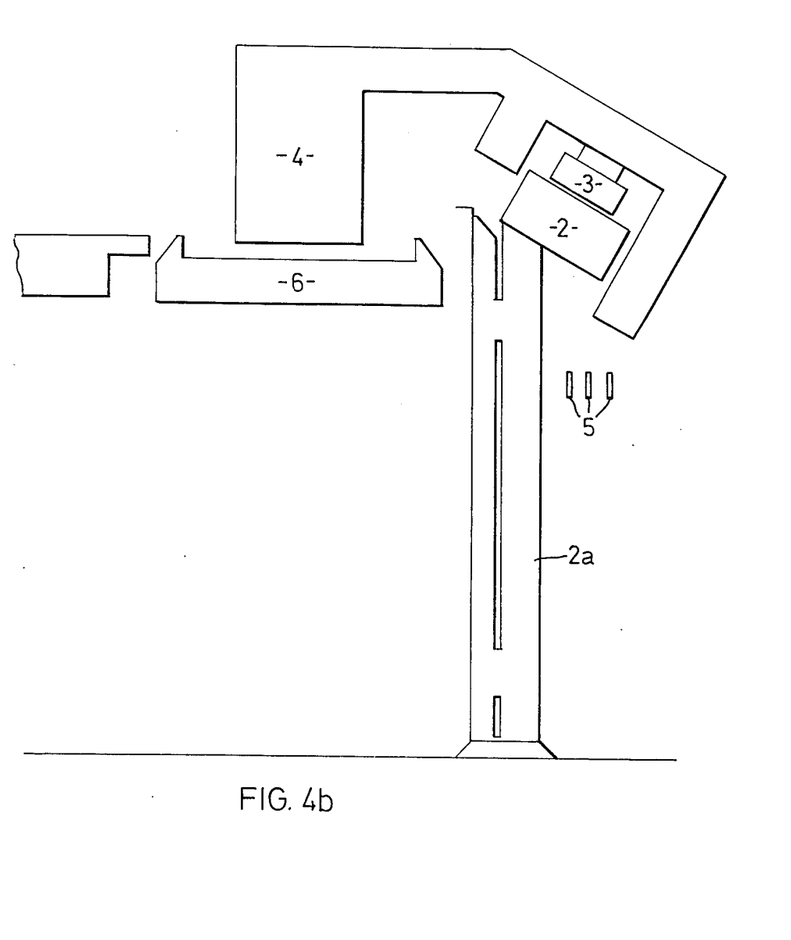
FIG. 4b illustrates a method of arrangement similar to that of FIG. 4a but with an inclined rail.

It will be noted that the arrangement illustrated in FIGS. 1 and 2 utilises an inclined rail according to the method of arrangement illustrated in FIG. 4b whereas the arrangement shown in FIGS. 3a and 3b utilise a flat rail in accordance with the method of arrangement illustrated in FIG. 4a. Apart from this mounting detail, the two mechanical constructions are generally similar. It has been found that if the rail is tilted or inclined as shown, various advantages are obtained, for instance better weight distribution on the carriage wheels and prevention of material or objects resting on the track rail in the path of the carriage. It should also be noted that although reference is made herein to the possible use of relay type controls, in practice it is found that such relays are unreliable over long periods of use. Thus solid state control is highly preferred. The scope of the invention is, however, intended to embrace the use of relays.

Details are not given herein of the signalling methods utilised from the remote control station to the electrical system of the carriage, but it is preferred that this be achieved by the use (as shown in FIG. 2) of low frequency radio signals carried by an aerial bar (Ae) for the full length of the track and received by an encapsulated antenna (A) mounted on the carriage.

In the drawings several integers, such as the gripper head jaws, are shown in a plurality of possible positions, distinction between various positions being by illustration in full and broken lines.

A carriage 1 is guided along an elongated rail 2 mounted on a rail support 2a. The carriage 1 is powered by one or more linear motors 3 and carries a gripper head 4 comprising gripper jaw halves and gripper fingers to be detailed hereinafter. The power for the carriage linear motor(s) and the carriage gripper head is supplied to the carriage by stationary conductors 5 in contact with pick-up members 50 carried by the carriage 1. The gripper head travels along a run-out table 6 which provides support for an extrusion being pulled.

The carriage is guided along the rail 2 by guide rollers 7, the said guide rollers being mounted on eccentrics and engaging the top and/or bottom and/or sides of the said rail.

As shown in FIGS. 1, 2 and 3a and 3b, the carriage 1 carries at its pulling end gripper head 4 comprising a pair of jaw halves 41 movable one to each side of a gap, not shown but conveniently provided at the region 42. The jaws pivot around horizontal axes 43 under the control of any suitable power linkage. The gripper head 4 also comprises a plurality of depending fingers 44, each individually spring loaded and individually pivotal about a common horizontal axis 45. Movement of the individual fingers 44 is under the common control of any suitable power linkage, conveniently associated with the linkage operative on the jaw halves 41.

More specifically, the fingers 44 each comprise an end region 46 sprung at 47 to a mounting 48 which is extended (not shown) for connection to a connecting rod of the power linkage. Conveniently the said mountings are positively operable in a gang on the fingers (e.g. via lost motion cams) whereby a single actuation stroke of the connector rod will simultaneously lift all the fingers to allow the entry of an extrusion, into the head. The fingers are then released and being individually sprung and individually pivotal can clampingly match the extrusion profile.

More specifically with regard to the jaw halves, it is convenient for these to be operable by spur gear quadrants as at 50, the spur gear quadrants being controlled by a shaft of the power linkage to allow opening of the jaw halves to receive the extrusion end.

Two linear motors are shown at 3, but it is to be noted that one single motor or a larger plurality of motors may equally well be used.

Figure 5:
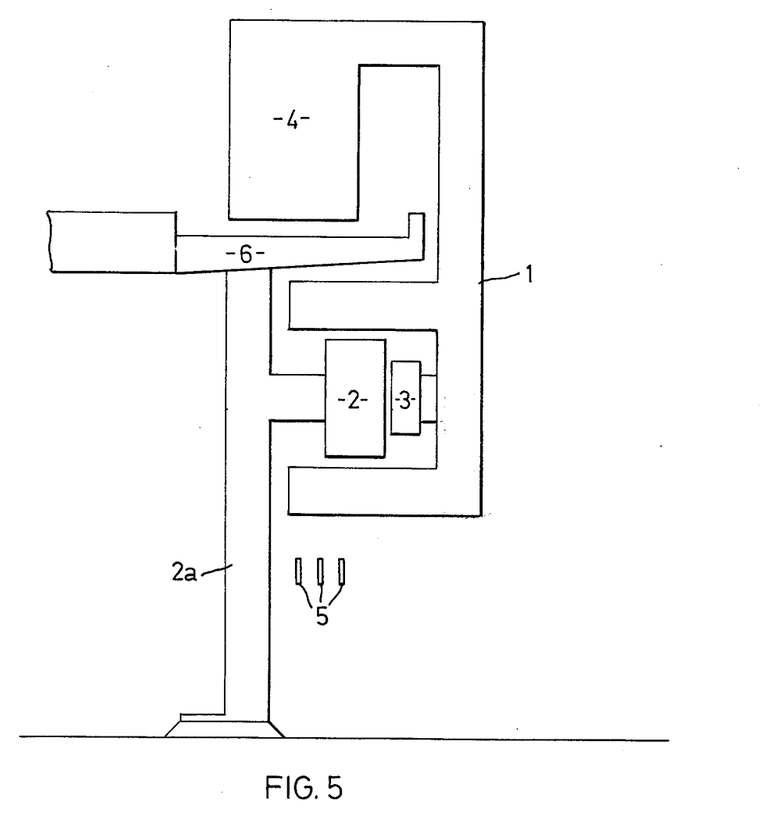
FIG. 5 illustrates an alternative method of arranging a carriage with respect to a rail.
Figure 6:
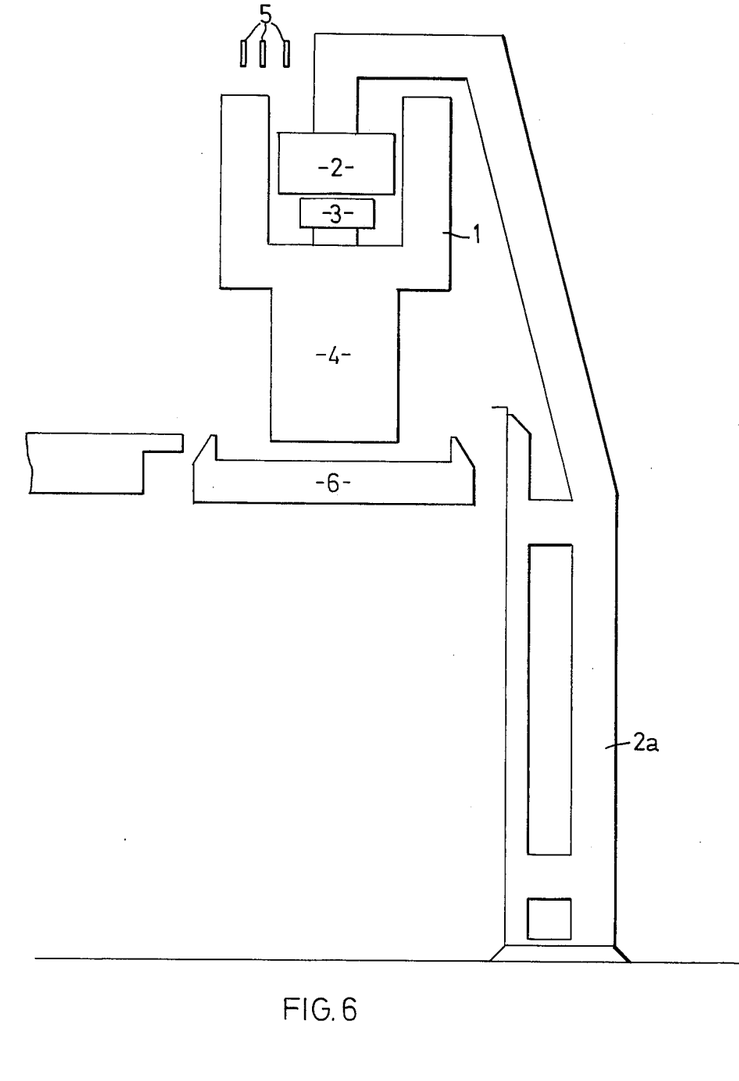
FIG. 6 illustrates a further alternative method of arranging a carriage with respect to a rail.

With reference now to FIGS. 4a, 4b, 5 and 6, there are shown in generally schematic form various alternative locations for the carriage 1, the rail 2, the rail support 2a, the linear motor 3, the rail support 2a, the gripper head 4, the conductors 5, and run-out table or extrusion support 6. Thus in FIG. 4a there is shown the motor and carriage associated with a flat rail alongside the run-out table 6. In FIG. 4b the rail is inclined. In FIG. 5 there is shown a carriage and motor associated with a rail beneath the run-out table 6, and in FIG. 6 there is shown a carriage and motor associated with a rail above the run-out table 6. In each case, however, the gripper head 4 is moved longitudinally along the length of the run-out table 6 for the purposes previously recited.

In use, and under the control of automatic or manual electronic control means, the carriage 1 is moved along the rail 2 towards the open mouth of the extrusion press. The gripper head jaw halves and fingers are opened to receive the extrusion end and are thereafter closed to grip the extrusion end. Thereafter the gripper head is moved along the run-out table by the carriage under the power of the linear motor as controlled from remote operator control. The power supplied to the linear motor is selected in accordance with the tension which it is required to apply to the extrusion. When the extrusion has been pulled or guided to the required length, power to the motor is cut off and the carriage is stopped. The gripper head jaw halves and fingers are thereafter opened to release the extrusion and the carriage is returned to its initial position, adjacent the extrusion press, by the application of reverse power to the carriage.

A more specific cycle of operation is as follows:

The carriage is initially at the press with the power off and the gripper head jaw halves closed and the fingers in the raised or open position. The operator selects a required tension on the remote controller, as predetermined by the cross sectional area and the material type being extruded. The press extrudes and the extrusion end passes into the opened gripper head. The operator visually determines the suitable length of entry of the extrusion into the head and presses a start control. Power is thereby applied to the carriage and the gripper head closed to grip the extrusion end. The carriage moves away from the press with the speed governed by the extrusion speed. The carriage travels to the full extent of the extrusion run, whereat a signal from the press, or from a manual control push button at the remote controller, signals the end of the extrusion cycle and the power to the linear motor is turned off. The power supply to the gripper head actuated is reversed so that the gripper head opens and the extrusion is released for removal. The carriage then returns to the extrusion press on fixed power supply at synchronous linear speed. At a predetermined distance from the press proximity switches (conveniently dual for safety) provided on the rail are operated by a fixed length bar on the carriage to provide pulses to reverse the linear motor. The carriage speed reduces before the final stop and travels at low speed to an end stop adjacent the press. Power remains applied on the carriage for a predetermined time delay period and a proximity switch positioned on the rail actuates the gripper head to close the jaw halves. The time delay expires, the power is switched off and the carriage is ready for the next cycle of operation.

Figure 7:
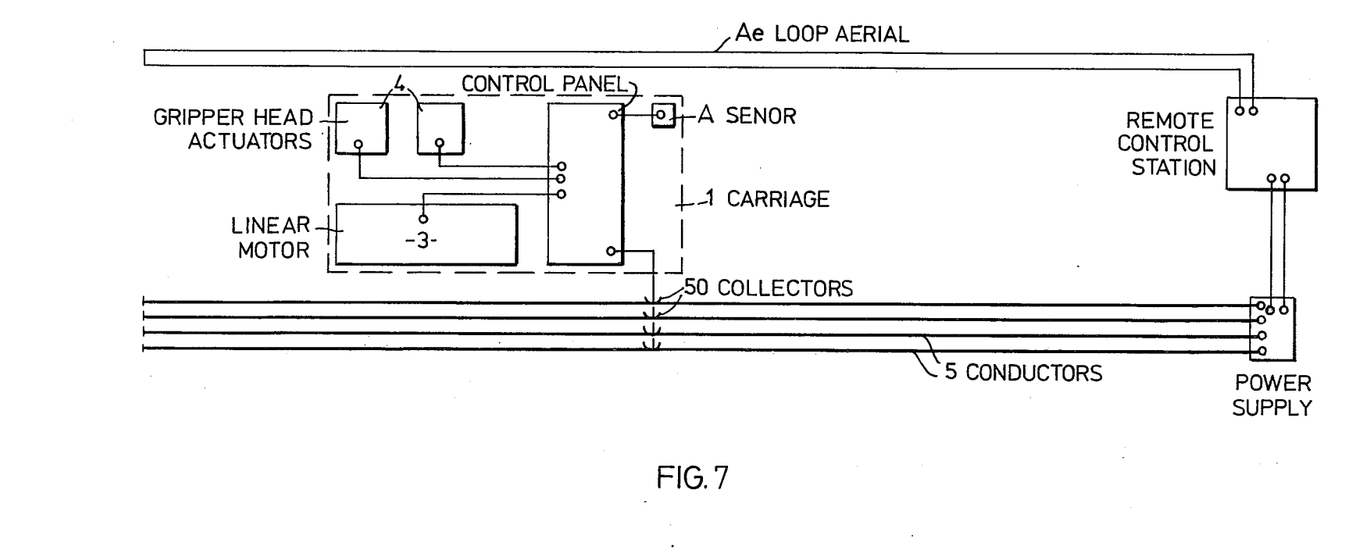
FIG. 7 illustrates in diagrammatically simplified manner the electrical circuitry for a puller according to the present invention.

In FIG. 7 there is shown in diagrammatic form the layout of an electrical system suitable for controlling the invention by means of a loop aerial, remote control station, and stationary and movable collectors as previously described. It is believed that FIG. 7 will be self-explanatory in the light of the foregoing specific description.

Various modifications of the invention may be made within the scope of the statements made herein and it is to be borne in mind that although a monorail system is illustrated for carrying the carriage, it should be borne in mind that any suitable rail system may be adopted. Furthermore any gripper head may be utilised in association with a linear motor-powered carriage in accordance with the invention.

I claim:

1. An extrusion puller comprising an elongated rail, a carriage and at least one on-board linear motor, means connected between said carriage and said linear motor for driving said carriage along said rail, said carriage carrying a gripper head for grasping the end of the extrusion to be pulled, and said carriage being powered by said on-board linear motor, said linear motor and said means cooperating with said carriage and rail not only for driving the carriage along the rail but also for providing by slippage a clutch effect for pulling control.

2. An extrusion puller according to claim 1 and including a power supply for transmitting energy to said linear motor, said power supply including stationary conductors extending in the same direction as and located in the vicinity of said rail and pick-up members carried by said carriage for movement therewith and contacting said stationary conductors, so that there are no trailing wires associated with said carriage.

3. An extrusion puller according to claim 2 wherein said rail is of sandwich form having an aluminium covering between said rail and an active surface of said linear motor.

4. An extrusion puller according to claim 1 including a power supply to said linear motor on the carriage, said power supply being controlled by wireless signals from a remote control station, said carriage carrying a power variation device for receiving said signals.

5. An extrusion puller according to claim 4 wherein the signals are low frequency radio signals, an aerial extending for the full length of the rail and said power variation device including carrying said radio signals, and an encapsulated antenna mounted on the carriage for receiving said signals and for controlling said power variation device.

6. An extrusion puller according to claim 1 wherein solid state circuitry is carried on board the carriage for controlling said linear motor.

7. An extrusion puller according to claim 1 wherein the gripper head houses a plurality of horizontally pivoted depending fingers, which are individually tiltable about a common axis and are individually spring loaded, and power means for collectively driving said fingers out of and into engagement with an extrusion end.

8. An extrusion puller according to claim 7 wherein the gripper head further comprises two half jaws movable laterally outwardly about horizontal axes at right angles to the axis of the fingers.

9. An extrusion puller according to claim 1 wherein said rail which carries the carriage is a monorail.

10. An extrusion puller according to claim 2 wherein said conductors are formed with grooves therebelow to receive said pickup members.

11. An extrusion puller according to claim 1 wherein the carriage is provided with top, bottom and side guide rollers.

12. An extrusion puller according to claim 1 wherein the rail is in a horizontal plane and mounted alongside said rail is a run-out conveyor over which the carriage travels.

13. An extrusion puller according to claim 1 wherein said rail is tilted and mounted alongside said rail is a run-out conveyor over which the carriage travels.

14. An extrusion puller according to claim 1 including a runout conveyor and wherein said rail is mounted below a run-out conveyor along which the carriage travels.

15. An extrusion puller according to claim 1 including a runout conveyor and wherein the carriage is mounted above said run-out conveyor and over which the carriage travels.

* * * * *